United States Patent [19]

Zurkoff et al.

[11] 4,331,623
[45] May 25, 1982

[54] POLYMER FLOW THROUGH DIE

[75] Inventors: Bernard Zurkoff, Springfield, N.J.; Bennie M. Lucas, Odessa, Tex.

[73] Assignee: El Paso Polyolefins Company, Paramus, N.J.

[21] Appl. No.: 944,837

[22] Filed: Sep. 22, 1978

[51] Int. Cl.³ ............................................... B29F 3/01
[52] U.S. Cl. .................................. 264/141; 264/140; 264/142; 264/338
[58] Field of Search ............... 264/142, 338, 140, 141

[56] References Cited

U.S. PATENT DOCUMENTS 3,060,511 10/1962 Parmella ............................ 264/142
3,100,724 8/1963 Rocheville .......................... 239/424
3,436,449 4/1969 Treu et al. .......................... 264/142

Primary Examiner—James H. Derrington
Attorney, Agent, or Firm—Fred S. Valles; Margareta LeMaire

[57] ABSTRACT

Polyolefin resin pellets of greater uniformity of shape and characterized by an almost complete absence of tails are obtained by the use in the pelletizing apparatus of dies which have been coated by a thin layer of finely divided solid lubricant such as molybdenum disulfide or, preferably, graphite applied to the interior surfaces of the die by cross bombardment with a stream or streams of finely divided solid lubricant under pressure.

10 Claims, 1 Drawing Figure

GRAPHITE BOMBARDMENT OF DIE ORIFICES

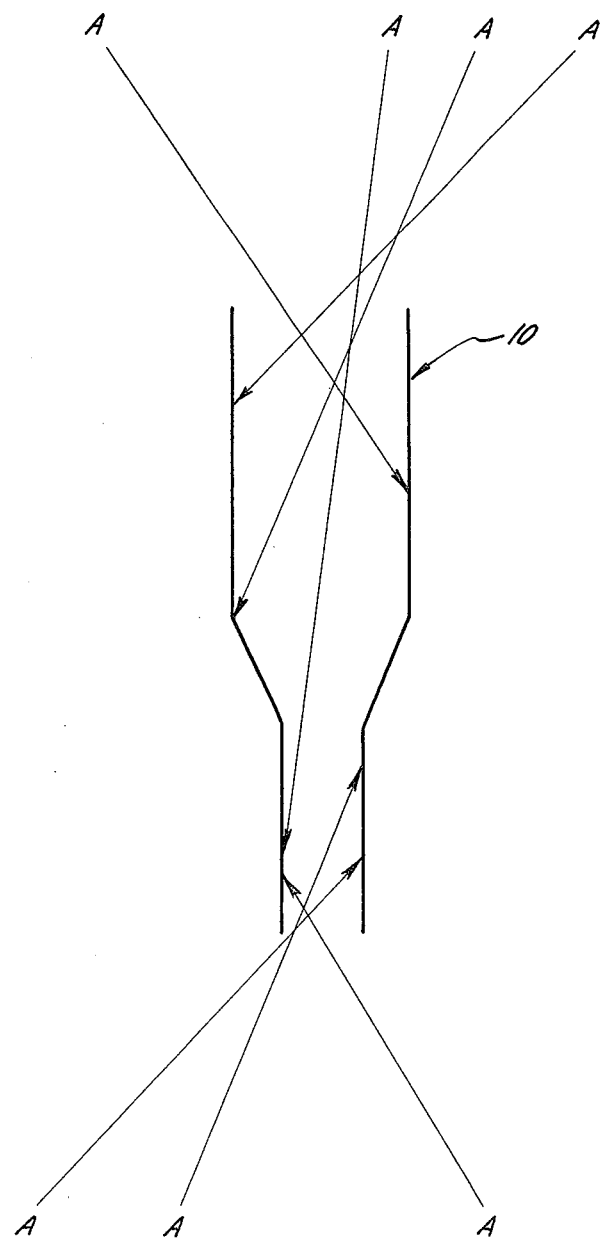
GRAPHITE BOMBARDMENT OF DIE ORIFIES

POLYMER FLOW THROUGH DIE

BACKGROUND OF THE INVENTION

Thermoplastic resins are commonly provided for commercial use in the form of pellets. Various pelletizing methods have been employed after the plastic mass formed in a polymerization reaction has been forced through a die under sufficient pressure. In what is known as the cut strand method a die with a large number of small holes is used, the hole being of various geometrical configurations including round, square and triangular shapes. After the plastic mass has been forced through the die, the strands formed are cooled and then chopped into short pieces by a rotary blade cutter. The pellets obtained are in the form of short cylinders or prisms. However, it is difficult in high rates of production to satisfactorily handle the large number of strands which are involved.

In the die face cut method, instead of drawing a strand from the die, however, the hot extrudate is cut off at the die face by a rapidly moving blade. This is commonly carried out underwater and the procedure is, therefore, known as underwater pelletizing. It is also possible to realize the same results by extruding the plastic mass into air and providing for the cutter to throw the pellets into water as soon as they are cut in order to prevent the hot pellets from sticking together. This is called hot face pelletizing. This method produces pellets which are generally a distorted spherical shape and is a frequently employed method of pelletizing polyolefin plastics. It is an especially desirable method for use when the formed plastic material is to be transferred by an air conveyor since the spherical shape generally does not result in the production of as large an amount of fines during transfer.

However, the pellets heretofore available by the practice of previously known procedures suffered from the disadvantages of a non-uniform pellet geometry and by the presence of imperfections in the form of adhering solidified chunks or strands. The procedure also resulted in plugged holes in the die. These disadvantages resulted in the generation of high proportion of scrap during the production of resin pellets. With certain difficultly processable materials such as some types of polypropylene the amount of scrap generated could amount to from 5% to 20% of total production.

Various means have been employed in the prior art to achieve the production of more uniformly shaped pellets and to prevent the development of imperfections in the pellets. An illustrative prior patent is Guill U.S. Pat. No. 3,029,466 of 1962. Neither this patent or any prior art known to applicants provide the economic and efficient means for the provision of uniformly shaped pellets which comprises the subject matter of this invention.

SUMMARY OF THE INVENTION

In accordance with the present invention, uniformly shaped resin pellets free from tails are obtained by the use in the extrusion process of dies which have been subjected to high pressure bombardment with a stream of finely divided solid lubricant particles, such as molybdenum disulfide or, preferably, graphite particles. This bombardment under pressure results in the finely divided solid lubricant particles, illustratively graphite particles, being driven into the die surface to a depth of about 0.0002 to 0.0004 inch. The bombardment procedure whereby a coating or layer of finely divided solid lubricant is applied to the die surfaces is known as microsealing.

It has been determined that in order for the treated die to achieve the desired results the microsealing must be carried out over all areas of the die. All of the interior areas must be microsealed as well as the outer areas. Hence, it will be evident that subjecting the die to a perpendicularly directed stream of finely divided solid lubricant particles, illustratively, graphite particles, will not be sufficient. The stream must be applied at such angles as will effectively reach all of the interior portions of the die. This can be achieved in several fashions. Thus, the die can be subjected to cross-angled streams carrying the fine graphite particles or the die can be rotatably mounted in a suitable holder and rotated under an angularly directed stream until all interior and exterior surfaces have been exposed to the stream. A suitable device for carrying out the microsealing process is disclosed in U.S. Pat. No. 3,100,724 and the conditions for application of the graphite layer are likewise discussed therein. However, this patent does not recognize the necessity for the coating of all areas of the die, interior as well as exterior, nor suggest so doing.

The preparation of the microsealed dies employed in carrying out the present invention is shown in the drawing. As shown, the complete coating of interior and exterior die surfaces is effected by bombarding the die with finely divided solid lubricant particles, illustratively graphite particles from all directions, illustrated by arrows A, both upstream and downstream of the die plate represented by 10. The bombardment of the die plate by graphite particles coming as it does from all directions and at all angles results in the thorough coating of interior and exterior surfaces which leads to the desirable results achieved according to the practice of this invention.

The consistently uniform pellet geometry obtained from a die subjected to this treatment is directly related to the number and degree of open polymer orifices during pelletization. The incorporation and surface coating of sub micron particle size graphite into and onto the die orifices lowers the coefficient of friction of metal to plastic, thereby resulting in a greater number and degree of orifice opening. The procedure described results in the desired penetration accompanied by the deposition of a surface coating, which, however, washes away after a short period.

While the foregoing discussion has been directed primarily to the use of graphite particles other finely divided solid lubricants such as molybdenum disulfide can also be employed.

The microsealed dies can be advantageously employed in the pelletizing of many materials, including the various thermoplastic resins such as polystyrene, styrene, acrylic resins acrylonitrile-butadiene-styrene copolymers and polyolefins including polyethylene, but find particular application in the pelletizing of polypropylene resins, most particularly of low melt flow rate of polypropylene.

EXAMPLE

A graphite microsealed die having a total of 230 orifices was incorporated into a polypropylene resin production line. Each extrusion orifice had cross-sectional diameter openings of about 0.090 inch and were spaced at about 0.750 inches. The resin was introduced into the resin chambers at an inlet pressure of about 1500 pounds per square inch and at a temperature of about 520° F. The resin was extruded at a die orifice temperature of about 490° F. into water maintained at about 140° F. by the continuous introduction of water at a regulated temperature of 140° F. The capacity of the pelletizer is about 25,000 pellets per pound of resin and approximately 17.0 pounds of resin were produced per hour per orifice. The pellets produced were of a uniformly spherical shape free from tails and having an overall bulk density of about 35 pounds/ft.$^3$.

A second run was carried out under identical conditions except that the die which was used had not been microsealed. The pellets obtained were not of a uniformly spherical shape and a high percentage had objectionable tails or like imperfections.

A sieve analysis based on percent retained was carried out on the pellets obtained from the run in which the microsealed die was employed, identified in Table 1 below as Run A, and the run in which the untreated die was employed, identified in Table 1 below as Run B. The results observed demonstrate that Run A was greatly superior in its production of pellets containing a far lesser amount of material having a sieve size of 5 mesh or less, generally regarded as unsuitable for commercial sale.

TABLE 1

| Extruder Mesh | Percent of Material Retained | |
|---|---|---|
| | A | B |
| 4 | 0.0 | 0.04 |
| 5 | 0.04 | 2.46 |
| 7 | — | — |
| 10 | — | — |
| 12 | 99.9 | 97.45 |
| Pan | 0.04 | 0.04 |

In normal operation, materials retained on screens of 5 mesh or less are rejected as overs with negligible sales value.

What is claimed is:

1. A method of forming pellets of thermoplastic materials which comprises heating and mixing thermoplastic material to bring the same into a homogeneous extrudable condition, extruding said heated material through an extrusion die orifice, said orifice having interior and exterior surfaces coated and impregnated with finely divided solid lubricant particles, whereby the coefficient of friction of metal to plastic is lowered, and collecting the pellets thus formed.

2. A method according to claim 1 wherein the finely divided solid lubricant is molybdenum disulfide.

3. A method according to claim 1 wherein the finely divided solid lubricant is graphite.

4. A method according to claim 3 wherein the pellets are collected by extrusion in a liquid medium.

5. A method according to claim 4 in which the thermoplastic material is a polyolefin.

6. A method according to claim 5 in which the polyolefin is polypropylene.

7. A method according to claim 6 wherein the polypropylene resin is a low melt flow rate polypropylene.

8. A method according to claim 5 in which the polyolefin is polyethylene.

9. A method according to claim 4 wherein the liquid medium is water.

10. A method according to claim 1 wherein the coating and impregnation is effected under high pressure.

* * * * *